(12) United States Patent
High et al.

(10) Patent No.: US 11,494,821 B2
(45) Date of Patent: Nov. 8, 2022

(54) METHODS AND SYSTEMS FOR AN ELECTRONIC SHELF LABEL SYSTEM

(71) Applicant: Walmart Apollo, LLC, Bentonville, AR (US)

(72) Inventors: Donald Ray High, Noel, MO (US); Martin Thomas Faitak, IV, Fayetteville, AR (US); Michael Dean Atchley, Eureka Springs, AR (US)

(73) Assignee: WALMART APOLLO, LLC, Bentonvillle, AR (US)

( * ) Notice: Subject to any disclaimer, the term of this patent is extended or adjusted under 35 U.S.C. 154(b) by 147 days.

(21) Appl. No.: 16/837,664

(22) Filed: Apr. 1, 2020

(65) Prior Publication Data

US 2020/0311794 A1    Oct. 1, 2020

Related U.S. Application Data

(60) Provisional application No. 62/827,684, filed on Apr. 1, 2019.

(51) Int. Cl.
*G06Q 30/06* (2012.01)
*G06F 3/14* (2006.01)
*G06K 19/07* (2006.01)
*G06K 7/10* (2006.01)

(52) U.S. Cl.
CPC ....... *G06Q 30/0623* (2013.01); *G06F 3/1423* (2013.01); *G06K 7/10297* (2013.01); *G06K 19/0723* (2013.01)

(58) Field of Classification Search
CPC .............. G06Q 30/0623; G06F 3/1423; G06K 7/10297; G06K 19/0723

USPC ....................................................... 705/26.61
See application file for complete search history.

(56) References Cited

U.S. PATENT DOCUMENTS

| 5,771,005 | A | 6/1998 | Goodwin, III |
| 6,105,004 | A | 8/2000 | Halperin et al. |
| 7,689,460 | B2 | 3/2010 | Natori et al. |
| 9,390,361 | B2 | 7/2016 | Wulff et al. |
| 2002/0167500 | A1 | 11/2002 | Gelbman |
| 2011/0025461 | A1 | 2/2011 | Nobutsugu et al. |
| 2011/0193679 | A1 | 8/2011 | Okabe et al. |
| 2012/0044056 | A1 | 2/2012 | Byun et al. |
| 2013/0226742 | A1* | 8/2013 | Johnson ............... G06Q 10/087 705/27.1 |
| 2014/0258028 | A1* | 9/2014 | Bynum ............... G01C 21/3484 705/26.8 |

(Continued)

*Primary Examiner* — Michael G Lee
*Assistant Examiner* — David Tardif
(74) *Attorney, Agent, or Firm* — Fitch, Even, Tabin & Flannery LLP

(57) ABSTRACT

An electronic shelf label system comprising an electronic display device and a plurality of electronic shelf labels is provided. A computing system transmits data transmissions to the plurality of electronic shelf labels. Each of the electronic shelf labels are configured to receive, from the computing system, data to render on an electronic display of each of the electronic shelf labels. The electronic display device is configured to determine, based on at least one of a set of specified conditions or the data rendered on each of the electronic shelf labels, content to be rendered on the electronic display of the electronic display device, and adjust the display of the electronic display device to render the content based on the determination.

19 Claims, 6 Drawing Sheets

(56) References Cited

U.S. PATENT DOCUMENTS

| | | | |
|---|---|---|---|
| 2016/0034732 A1* | 2/2016 | Cho | H04B 1/10 |
| | | | 340/10.1 |
| 2016/0048907 A1* | 2/2016 | Park | G06Q 30/0641 |
| | | | 345/634 |
| 2016/0134930 A1* | 5/2016 | Swafford | A47F 5/0068 |
| | | | 725/80 |
| 2018/0108078 A1* | 4/2018 | Howell | G06Q 10/087 |
| 2018/0276431 A1* | 9/2018 | Sequeira | G06Q 20/20 |
| 2020/0334620 A1* | 10/2020 | Yanagi | G06Q 30/06 |

* cited by examiner

METHODS AND SYSTEMS FOR AN ELECTRONIC SHELF LABEL SYSTEM

CROSS-REFERENCE TO RELATED PATENT APPLICATIONS

This application claims priority to U.S. Patent Application No. 62/827,684, filed on Apr. 1, 2019, the content of which is hereby incorporated by reference in its entirety.

BACKGROUND

Electronic labels can be placed on shelves to display information associated with objects placed on the shelves.

BRIEF DESCRIPTION OF THE DRAWINGS

To assist those of skill in the art in making and using exemplary embodiments of the present disclosure, reference is made to the accompanying figures. The accompanying figures, which are incorporated in and constitute a part of this specification, illustrate one or more embodiments of the present disclosure and, together with the description, help to explain the present disclosure. Illustrative embodiments are shown by way of example in the accompanying drawings and should not be considered as limiting. In the figures.

DETAILED DESCRIPTION OF EMBODIMENTS

Figure 1:
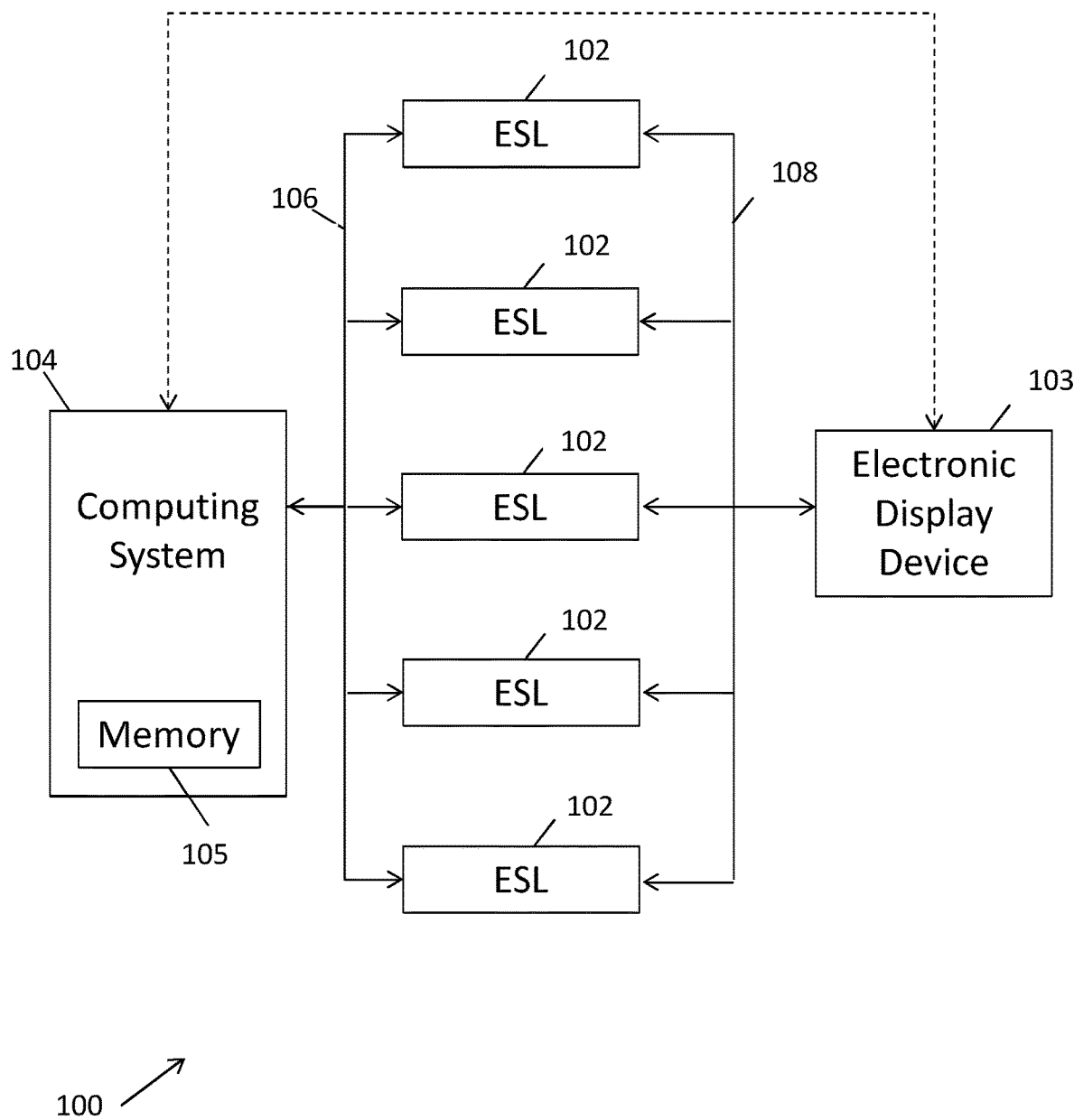
FIG. 1 illustrates an exemplary network environment for an electronic shelf label system, according to an exemplary embodiment.

Described in detail herein are methods and systems for an electronic shelf label system. The electronic shelf label system includes an electronic display device including an electronic display, a processor, and a communication module. The electronic shelf label system further includes electronic shelf labels that can be selectively associated with and/or disassociated from the electronic display device. When one or more of the electronic shelf labels are associated with the electronic display device, the one or more electronic shelf labels and the electronic display device can form a group. Each of the electronic shelf labels includes an electronic display, a processor, memory, and a communication module. The electronic shelf labels in the group can receive, from a computing system, data to render on the electronic display of the electronic shelf labels. The electronic display device determines, based on at least one of a set of specified conditions or the data rendered on each of the electronic shelf labels in the group, content to be rendered on the electronic display of the electronic display device, and adjusts the display of the electronic display device to render the content based on the determination.

The electronic shelf label system described herein automatically updates the electronic display device based on the content rendered on the one or more of displays of the electronic shelf labels and/or based on one or more products with which the one or more electronic shelf labels are associated. For example, the electronic display device may be larger than the electronic shelf labels and may be located above shelves while the electronic shelf labels are located on the shelves and are associated with products on the shelves. As a non-limiting example, the electronic display device can have a display measured diagonally of approximately ten (10) inches to approximately sixty (60) inches and the electronic shelf labels can have a display measured diagonally of approximately a half inch to approximately five (5) inches. The electronic display device may display, for example, a range of prices associated with the electronic shelf labels in the group (e.g., "$10-$20"), a lowest price displayed on the electronic shelf labels in the group (e.g., "$4.99 and up"), sale information if a price displayed on an electronic shelf label in the group is on sale (e.g., "on sale"), or other information.

In some embodiments, the set of specified conditions includes, but is not limited to, displaying a high price, displaying a low price, displaying a range of prices, displaying an average price, displaying text associated with one or more of the products associated with one or more of the electronic shelf labels in the group, or a combination of the above, based on the data rendered on one or more of the electronic shelf labels in the group. For example, where the set of specified conditions includes displaying a range of prices based on the data rendered on the electronic shelf labels in the group, the electronic display device receives the prices displayed on the electronic shelf labels in the group and determines a lowest price rendered and a highest price rendered on the electronic shelf labels in the group. The electronic display device then adjusts the display of the electronic display device to render the content based on the determination.

In some embodiments, the data received by one or more of the electronic shelf labels can be based on a location at which the one or more electronic shelf labels are disposed or will be disposed.

In some embodiments, each of the electronic shelf labels in the group can display a price for a specified product based on a location of each of the electronic shelf labels.

In some embodiments, at least one of the electronic shelf labels further includes a NFC module. The NFC module can be used to associate the electronic shelf label with the electronic display device when transmission from the NFC module of the electronic shelf label is within range of electronic display device which can include an NFC reader. In some embodiments, the NFC module can associate the electronic shelf label with the electronic display device when the electronic shelf label is placed in close proximity to the electronic display device.

In some embodiments, at least one of the electronic shelf labels stores coordinates of a three-dimensional (3D) model of a facility corresponding to a physical location at which the electronic shelf label is disposed or will be disposed. The electronic shelf label can execute a localization method to determine where the electronic shelf label is located within the 3D model, and can associate the electronic shelf label with the electronic display device using the 3D model (e.g., when the location of the electronic shelf label and the location of the electronic display device have coordinates in the 3D model that are within a specified range of each other or in a specified area of the 3D model, the electronic shelf label and the electronic display device can be associated with each other).

In some embodiments, the data transmitted by the computing system can be price information. Each electronic shelf label can receives price information to correspond to one or more products expected to be located at a location where the electronic shelf label is disposed or at a location where the electronic shelf label is to be disposed.

In some embodiments, the adjustment of the electronic display of the electronic display device changes at least one of a price, text, graphic, or lighting displayed on the electronic display device based on what is displayed on the electronic shelf labels in the group with the electronic display device.

In some embodiments, the electronic shelf labels can be included in the group based on locations at which each of the electronic shelf labels are disposed. In further embodiments, the electronic shelf labels are included in the group based on established communication between the electronic shelf labels and the electronic display device.

In some embodiments, the computing system associates the electronic shelf labels with the electronic display device. In some embodiments, the computing device associates the electronic shelf labels with the electronic display device based on a planogram of a facility within which the electronic shelf labels and the electronic display device are disposed.

In some embodiments, at least one electronic shelf label is configured to be disassociated from the electronic display device to ungroup the electronic shelf label from the group. In some embodiments, the electronic shelf label is disassociated from the electronic display device based on a change in location of the electronic shelf label, a reassignment of the electronic shelf label to a different product, when it is determined that the electronic shelf label should be disassociated from the group, or a combination of the above.

In some embodiments, the electronic shelf labels may be manual programmed by an employee, whereby the electronic shelf labels wirelessly communicate with the electronic display device or the employee triggers an association by selecting an input (and/or entering a code) on the electronic shelf label and selecting a specified input (and/or entering a code) on the electronic display device.

FIG. 1 illustrates an exemplary network environment for an electronic shelf label system 100 in accordance with embodiments of the present disclosure. The system 100 can include electronic shelf labels (ESL) 102 disposed within a building, an electronic display device 103, and a computing system 104. The computing system 104 can be in wireless communication 106 with the electronic shelf labels 102. The computing system 104 transmits data via wireless communication 106 to the electronic shelf labels 102 and/or can be in wireless communication 110 with the electronic display device 108. In an exemplary embodiment, the wireless communication 106 is Wi-Fi communication. The computing system 104 includes a data storage 105 that holds instructions for one or more of the electronic shelf labels 102 and/or the digital display device 108. Separate storage can also be used. The instructions include data for the display of information on the electronic shelf labels 102 and/or the electronic display device 103. This enables the computing system 104 to control and update information displayed on the electronic shelf labels 102 and/or the electronic display device 103.

The computing system 104 transmits the data to the one or more electronic shelf labels 102 and/or the digital display device. In an exemplary embodiment, the computing system 104 can transmit the data via the wireless communication 106 to the electronic shelf labels 102, to a defined group of the electronic shelf labels 102, and/or to a single electronic shelf label 102. Each electronic shelf label 102 can be identified by a unique identifier for receiving specific data from the computing system 104. In one embodiment, upon receiving the data, the receiving electronic shelf label 102 determines whether the instructions are intended for the receiving electronic shelf label by checking a unique identifier in the received instructions to determine the unique identifier in the received instructions matches the unique identifier of the receiving electronic shelf label 102.

The electronic shelf labels 102 can wirelessly communicate 108 with the electronic display device 103. In an exemplary embodiment, the wireless communication 108 uses at least one of Wi-Fi, Bluetooth, or RFID capabilities.

In some embodiments, the electronic shelf labels 102 wirelessly communicate 108 with the electronic display device 103 at a lower power level (e.g., low level Wi-Fi, Bluetooth, or RFID capabilities). The lower power level requires that the electronic shelf labels 102 be placed within communication distance of the electronic display device 103. The lower power level reduces the range of the transmissions of the electronic shelf labels 102 such that each electronic shelf label 102 can communicate with the electronic display device 103 within range of the transmissions at the lower power level, but cannot communicate with electronic display devices outside the range of the transmissions at the lower power level. Therefore, the electronic shelf labels 102 can only communicate with the electronic display device 103 associated with a same shelving unit and cannot communicate with electronic display devices on other shelving units based on their relative locations.

Figure 2:
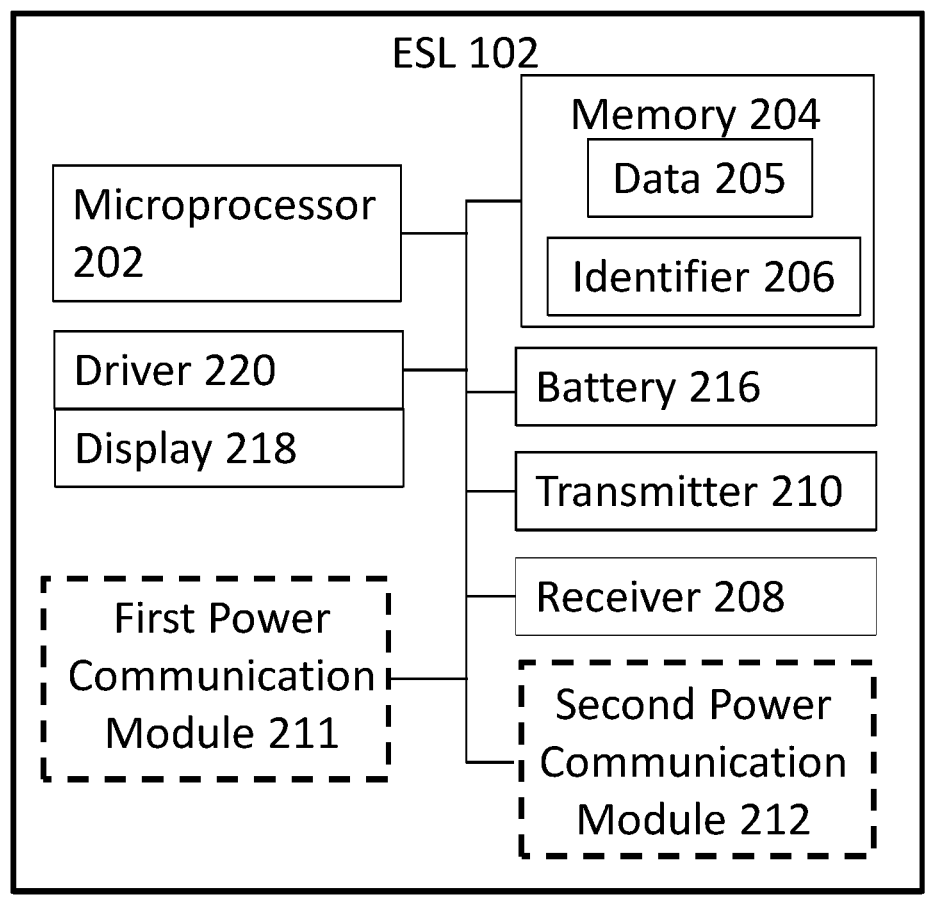
FIG. 2 is a schematic diagram of an exemplary electronic shelf label that can be utilized in the electronic shelf label system, according to an exemplary embodiment.

FIG. 2 is a schematic diagram of an exemplary embodiment of the electronic shelf label 102 used in the system 100. The electronic shelf label 102 includes a microprocessor 202 communicatively coupled to a memory 204 storing data 205 and a unique identifier 206, and a battery 216 to provide power to the electronic shelf label 102. The electronic shelf label 102 further includes a receiver 208 configured to receive signals via communication 106 transmitted from the computing system 104 and convert the signals to electrical signals that can be read by the microprocessor 202. The electronic shelf label 102 further includes a transmitter 210 configured to transmit signals via communication 108 to the electronic display device 103. In some embodiments, the receiver 208 and transmitter 210 are combined into one unit (e.g., a transceiver unit).

In some embodiments, the electronic shelf label 102 includes a first power level (FPL) communication module 211 and a second power level (SPL) communication module 212. The FPL communication module 211 and the SPL communication module 212 are configured to transmit and/or receive data at different power levels to control a range of communication with the computing system 104 and the electronic display device 103, as described herein. For example, the FPL communication module 211 is configured to receive signals at a first power level via wireless communication 106 transmitted from the computing system 104 and/or transmit signals at a first power level via wireless communication 106 to the computing system 104. The SPL communication module 212 is configured to transmit signals at a lower power level via wireless communication 108 the electronic display device 103. The SPL communication module 212 is configured to transmit data at the lower power level using at least one of low level Wi-Fi, Bluetooth, low energy Bluetooth, near field communication (NFC), or RFID capabilities. In another embodiment, the SPL communication module 212 can be configured to transmit signals at the lower power level through RFID connections to the electronic display device 103.

While the non-limiting example embodiment shown in FIG. 2 includes the FPL communication module 211 and the SPL communication module 212, exemplary embodiments of the electronic shelf labels 102 can include a single communication module that is configured to selectively transmit data/information at a single power level to the electronic display device 103 and/or the computing system 104.

The electronic shelf label 102 can further include an electronic display 218 controlled by the microprocessor 202. For example, the display 218 may be a dot matrix display, a segment-based display, a Light Emitting Diode (LED) display, a Liquid Crystal Display (LCD), an electronic ink (e-ink) display, and/or any suitable display type. In one embodiment, the electronic shelf label 102 includes a display driver 220, and the microprocessor 202 is arranged to control updates of the electronic display 218 by controlling the display driver. The electronic display 218 can display product information, stored in memory 204 as data 205, in different fields of the electronic display 218, such as one or more of a price per item of the product, a price per unit, a special offer, a number of items of the product in stock, an expected number of merchandise on a shelf, space management information, or an indicator field. The indicator field may be used, for example, to display a red light to indicate a discount. The fields may be arranged in different ways and/or used for displaying other types of information as desired. Normally, however, price information is displayed.

The microprocessor 202 of the shelf label 102 is configured to receive the data 205 from the computing system 104 to configure the electronic shelf label 102 to display particular information on the electronic display 218, such as a new price for a product associated with the electronic shelf label 102. However, other kinds of product information may also be updated. More particularly, the microprocessor 202 is configured to process the received data 205 and relate the data 205 to images displayed on the electronic display 218. In other embodiments, a person can manually program the electronic shelf label 102 to display particular information on the electronic display 218, such as a new price for a product associated with the electronic shelf label 102.

Figure 3:
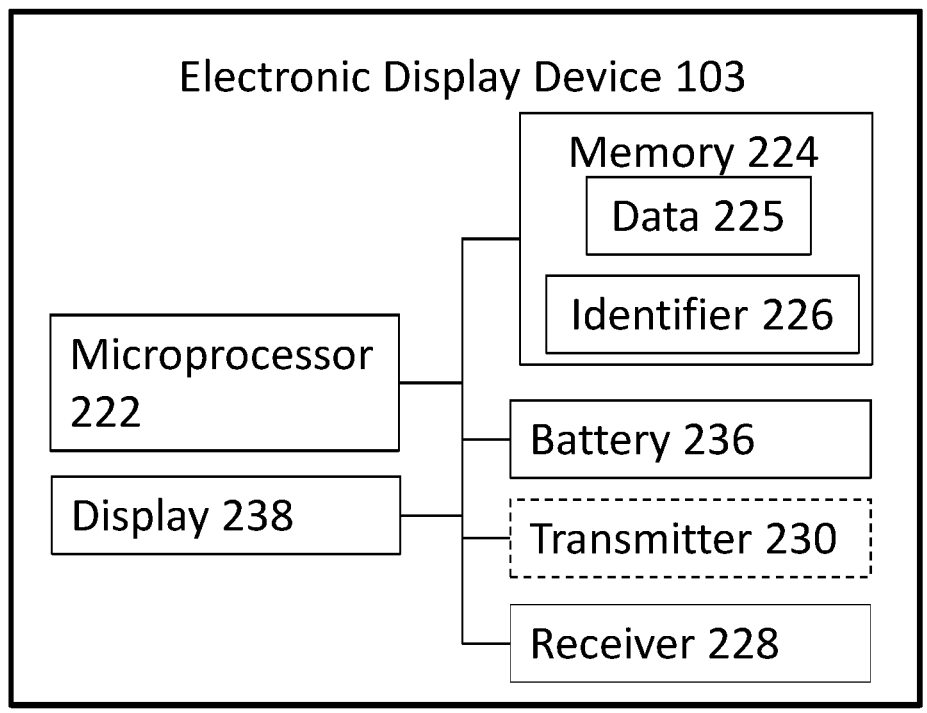
FIG. 3 is a schematic diagram of an exemplary electronic display device that can be utilized in the electronic shelf label system, according to an exemplary embodiment.

FIG. 3 is a schematic diagram of an embodiment of the electronic display device 103 used in system 100. The electronic display device 103 includes a microprocessor 222 communicatively coupled to a memory 224 storing data 225 and a unique identifier 226, and a battery 236 to provide power to the electronic display device 103. The electronic display device 103 further includes a receiver 228 including an antenna configured to receive signals via communication 108 transmitted from the electronic shelf labels 102, and convert the signals to electrical signals that can be read by the microprocessor 222. In some embodiments, the electronic display device 103 may further includes a transmitter 230 including an antenna configured to transmit signals via communication 108 to the electronic shelf labels 102 and/or to transmit signals via communication 106 to the computing system 104. In some embodiments, the receiver and transmitter can have a common antenna. In some embodiments, the receiver 228 and transmitter 230 are combined into a transceiver unit.

The electronic display device 103 can further include an electronic display 238 controlled by the microprocessor 222. For example, the display 238 may be a dot matrix display, a segment-based display, a Light Emitting Diode (LED) display, a Liquid Crystal Display (LCD), an electronic ink (e-ink) display, and/or any suitable display type. In one embodiment, the electronic display device 103 includes a display driver 240, and the microprocessor 222 is arranged to control updates of the electronic display 238 by controlling the display driver 240. The electronic display 238 can display product information in different fields of the electronic display 238, such as a range of prices shown on the electronic shelf labels 102 grouped with the electronic display device 103, a high price shown on the electronic shelf labels 102 grouped with the electronic display device 103, a low price shown on the electronic shelf labels 102 grouped with the electronic display device 103, an average price shown on the electronic shelf labels 102 grouped with the electronic display device 103, text and/or graphics corresponding to product information for products associated with one or more of the electronic shelf labels 102 grouped with the electronic display device 103, or an indicator field. The indicator field may be used, for example, to display that at least one electronic shelf label 102 is displaying a discounted or sale price. The fields may be arranged in different ways and/or used for displaying other types of information as desired.

The microprocessor 222 of the electronic display device 103 is configured to receive data from the electronic shelf labels 102 and/or the computing system 104, and based on a set of specified conditions and/or the received data rendered on each of the electronic shelf labels 102 determine particular information to display on the electronic display 238. For example, the particular information may be a new price range for products associated with the electronic shelf labels 102 grouped with the electronic display device 103. However, other kinds of product information may also be updated. More particularly, the microprocessor 222 is configured to process the received information based on the set of specified conditions and the received data, and relate the information to images displayed on the electronic display 238.

Figure 4:
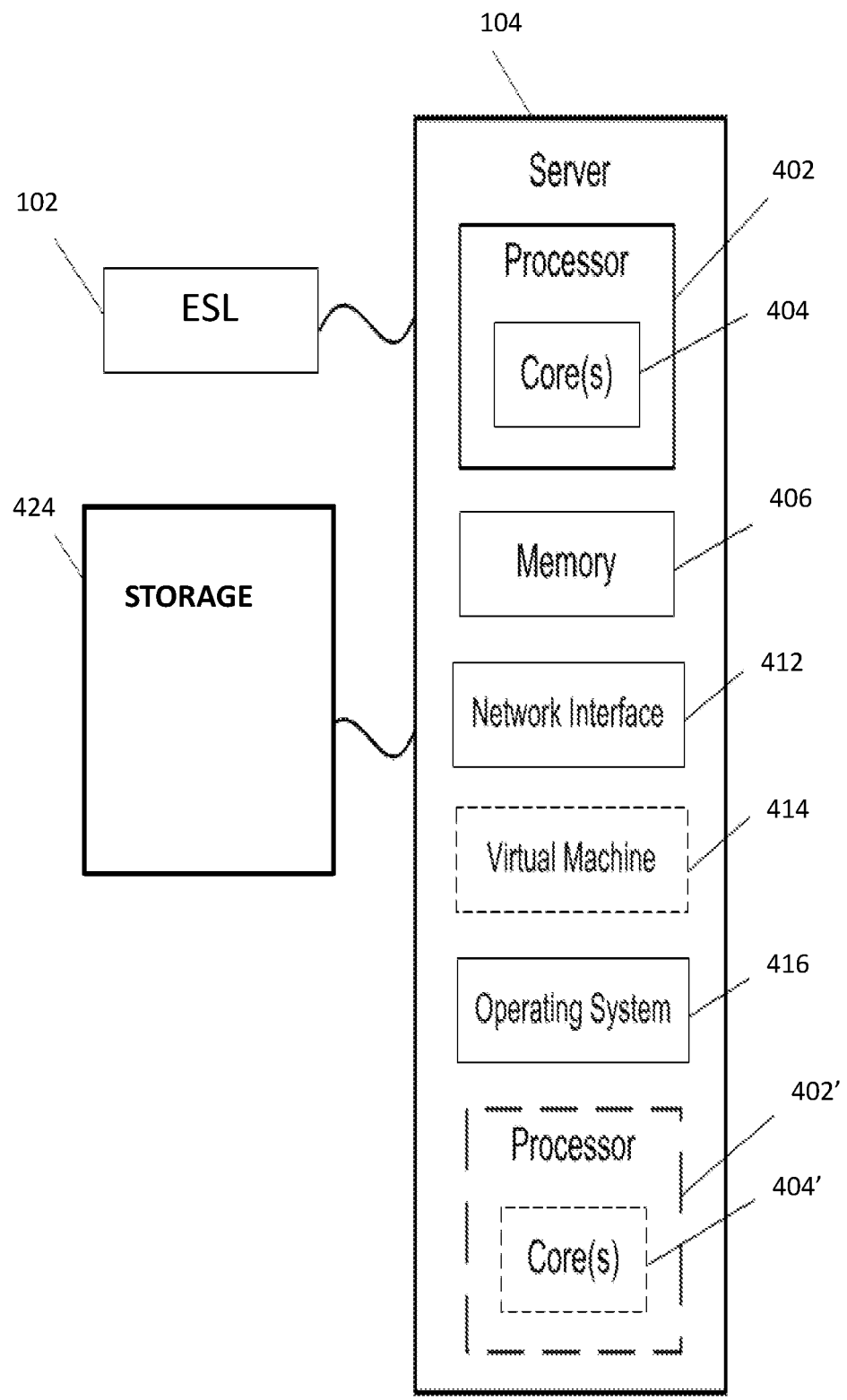
FIG. 4 is a schematic view of a computing system, according to an exemplary embodiment.

FIG. 4 is a schematic view of the computing system 104 according to an exemplary embodiment. The computing system 104 includes one or more non-transitory computer-readable media for storing one or more computer-executable instructions or software for implementing exemplary embodiments. The non-transitory computer-readable media can include, but are not limited to, one or more varieties of hardware memory, non-transitory tangible media (for example, one or more magnetic storage disks, one or more optical disks, one or more USB flash drives), and the like. For example, a memory 406 included in the computing system 104 can store computer-readable and computer-executable instructions or software for implementing exemplary embodiments. The computing system 104 also includes a processor 402 and an associated core 404, and optionally, one or more additional processor(s) 402' and associated core(s) 404' (for example, in the case of computer systems having multiple processors/cores), for executing computer-readable and computer-executable instructions or software stored in memory 406 and other programs for controlling system hardware. Processor 402 and processor(s) 402' can each be a single core processor or multiple core (404 and 404') processor.

In some embodiments, the computing system 104 may include a browser application and a browser cache. For example, the browser application can enable a user to enter data and product information.

Virtualization can be employed in the computing system 104 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other varieties of memory as well, or combinations thereof. In some embodiments, a user can interact with computing system 104 through a visual display device, such as a computer monitor, which can display one or more user interfaces that can be provided in accordance with exemplary embodiments. Visual display device may also display other aspects, elements and/or information or data associated with exemplary embodiments, such as product information. The computing system 104 may include other I/O devices for receiving input from a user, for example, a keyboard or any suitable multi-point touch interface, a pointing device (e.g., a pen, stylus, mouse, or trackpad). The keyboard and pointing device may be coupled to visual display device. The computing system 104 may include other suitable conventional I/O peripherals.

The computing system 104 can also include one or more storage devices 424, such as a hard-drive, CD-ROM, or other computer readable media, for storing data and computer-readable instructions and/or software that implements embodiments of the computing system 104, as described herein, or portions thereof. In an exemplary embodiment, the storage device 424 includes data 425 for configuring one or more electronic shelf labels 102 and/or the electronic display device, and unique identifiers to address the electronic shelf labels 102 and the electronic display device 103. In one embodiment, information to be displayed on each electronic shelf label 102 is stored as a file, such as an XML file or data packets, where each file or data packet determines a layout of the information on the electronic shelf label 102. In some embodiment, the information, such as price changes and other updated information, can be received by the computing system 104 from, for example, a price database. Exemplary storage device 324 can also store any suitable information required to implement exemplary embodiments.

The computing system 104 can include a network interface 412 configured to interface via one or more electronic shelf label 102 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or any other device suitable for interfacing the computing system 104 to any variety of network capable of communication and performing the operations described herein. Moreover, the computing system 104 can be any computer system, such as a workstation, desktop computer, server, laptop, handheld computer, tablet computer, mobile computing or communication device, or other form of computing or telecommunications device that is capable of communication and that has sufficient processor power and memory capacity to perform the operations described herein.

The computing system 104 can run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 416 can be run in native mode or emulated mode. In an exemplary embodiment, the operating system 416 can be run on one or more cloud machine instances.

Figure 5:
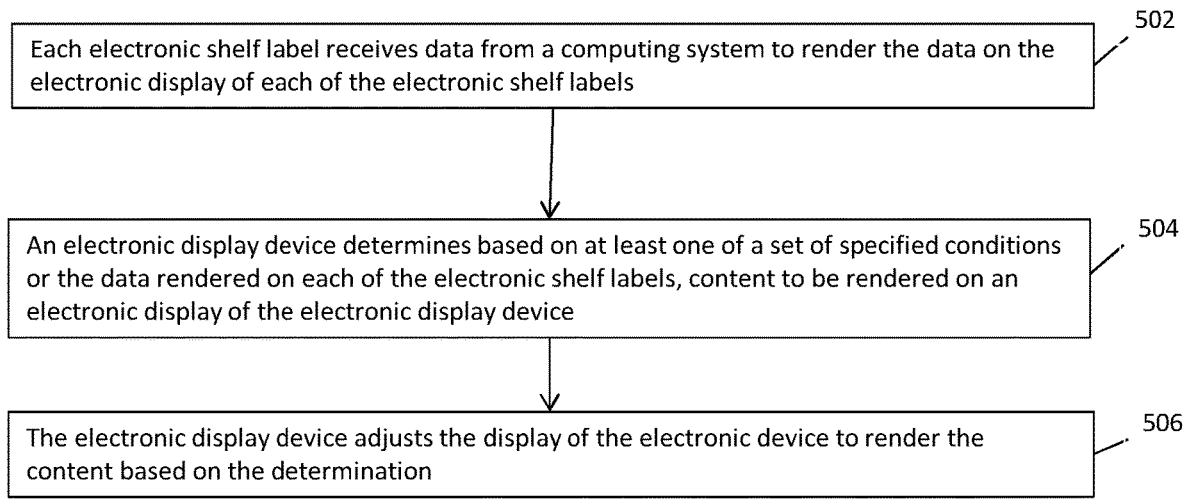
FIG. 5 is a flowchart illustrating an exemplary method of an electronic shelf label system.

FIG. 5 is a flowchart illustrating an exemplary method 500 of an electronic shelf label system. At step 502, one or more electronic shelf labels, configured to be selectively associated with an electronic display device to form a group, receives data from a computing system to render the data on the electronic display of each of the electronic shelf labels. At step 504, an electronic display device is in communication with the electronic shelf labels and determines based on at least one of a set of specified conditions or the data rendered on the electronic shelf labels, content to be rendered on an electronic display of the electronic display device. At step 506, the electronic display device adjusts the display of the electronic display device to render the content based on the determination.

Figure 6:
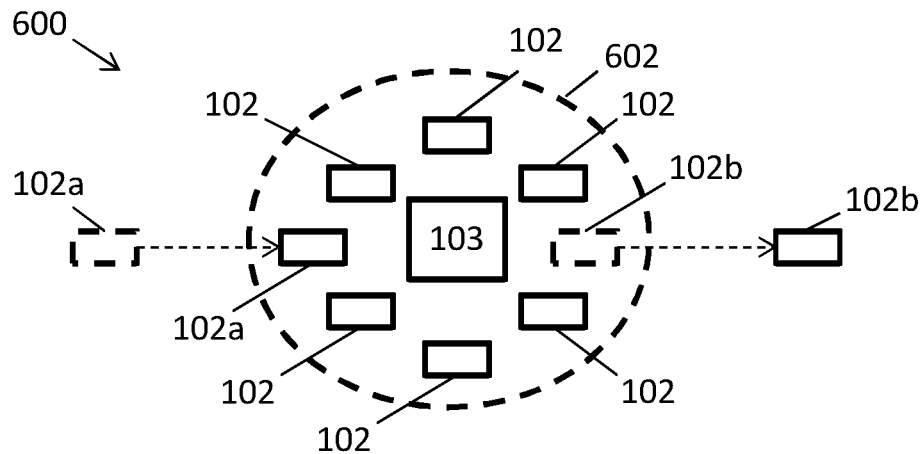
FIG. 6 depicts a group formed by an embodiment of an electronic display device and electronic shelf labels based on a proximity of the electronic shelf labels to the electronic display device, according to an exemplary embodiment.

FIG. 6 depicts a group formed by an embodiment of the electronic display device 103 and the electronic shelf labels 102 based on a proximity 602 of the electronic shelf labels 102 to the electronic display device 103. As described herein, the electronic shelf labels 102 can be selectively associated with and/or disassociated from the electronic display device 103 based on the proximity 602. For example, electronic shelf label 102a becomes associated with the electronic display device 103 when it enters the proximity 602 of the electronic display device 103, while an electronic shelf labels 102b become disassociated from the electronic display device 103 when the electronic shelf labels 102b leaves the proximity 602 of the electronic display device 103.

Figure 7:
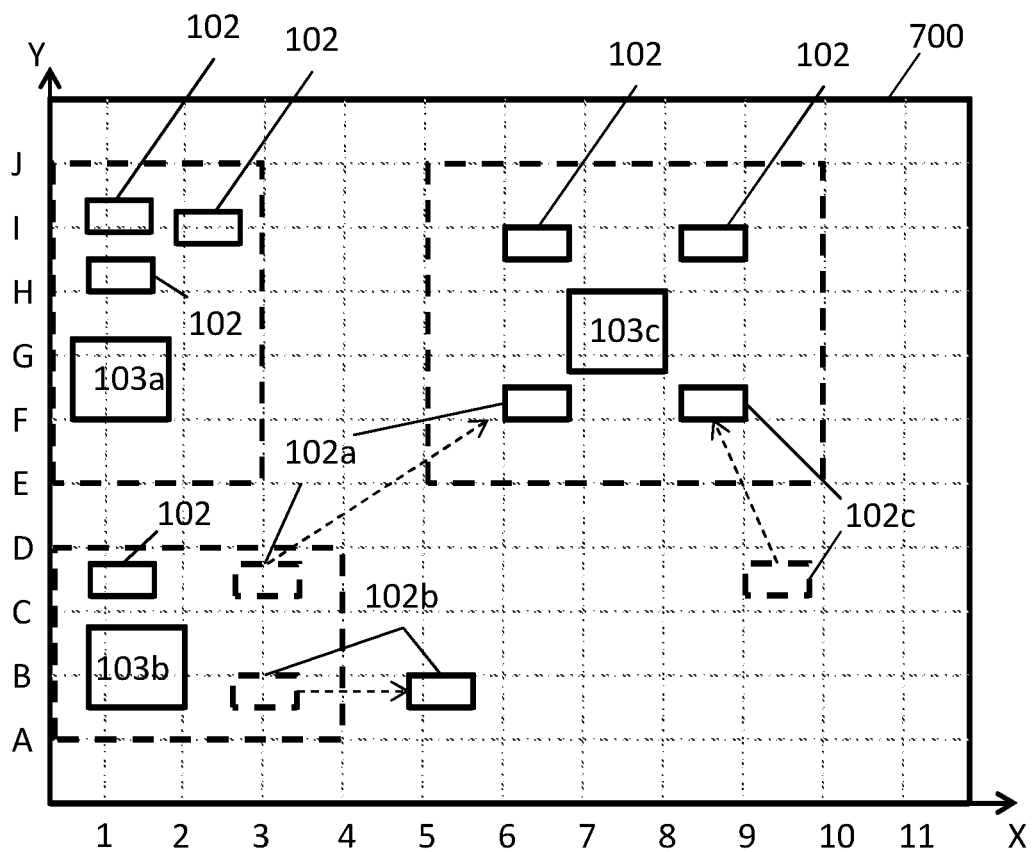
FIG. 7 depicts groups formed by an embodiment of electronic display devices and electronic shelf labels based on locations of the electronic shelf labels in a facility.

FIG. 7 depicts groups formed by an embodiment of the electronic display devices 103 and the electronic shelf labels 102 based on locations of the electronic shelf labels 102 in facility 700. As described herein, the electronic shelf labels 102 can be selectively associated with the electronic display devices 103 to form a group. For example, electronic shelf label 102a, initially in a group associated with an electronic display device 103b, when moved from a location or area (e.g., based on coordinates) associated with the electronic display device 103b to a location or area (e.g., based on coordinates) associated with the electronic display device 103c, becomes part of a group associated with the electronic display device 103c. Similarly, an electronic shelf label 102c becomes part of the group associated with the electronic display device 103c when the electronic shelf label 102c enters a location or area (e.g., based on coordinates) of the electronic display device 103c.

The description herein is presented to enable any person skilled in the art to create and use an electronic shelf label system as described herein. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. An electronic shelf label system comprising:
   an electronic display device including an electronic display, a processor, and a communication module;
   a plurality of electronic shelf labels configured to be selectively associated with the electronic display device to form a group, each of the electronic shelf labels including an electronic display, a processor, and a communication module;
   wherein each of the electronic shelf labels in the group is configured to:
      receive, from a computing system, data to render on the electronic display of each of the electronic shelf labels, and
   wherein the electronic display device is configured to:
      determine, based on at least one of a set of specified conditions or the data rendered on each of the electronic shelf labels, content to be rendered on the electronic display of the electronic display device, and
      adjust the display of the electronic display device to render the content based on the determination;
   wherein at least one of the plurality of electronic shelf labels is configured to be disassociated from the electronic display device to ungroup the at least one of the plurality of electronic shelf labels.

2. The system of claim 1, wherein the data is received by each of the electronic shelf labels based on a location of each of the electronic shelf labels.

3. The system of claim 1, wherein each of the electronic shelf labels display a price for a specified product based on a location of each of the electronic shelf labels.

4. The system of claim 1, wherein at least one of the plurality of electronic shelf labels further comprises a NFC module, wherein the NFC module associates the at least one of the plurality of electronic shelf labels with the electronic display device when transmission from the NFC of the at least at least one of the plurality of electronic shelf labels is within range of electronic display device.

5. The system of claim 4, wherein the NFC module associates the at least one of the plurality of electronic shelf labels is included in the group when the at least one of the plurality of electronic shelf labels is placed in close proximity to the electronic display device.

6. The system of claim 1, wherein at least one of the plurality of electronic shelf labels stores coordinates of a three-dimensional (3D) model of a facility, wherein the at least one of the plurality of electronic shelf labels is further configured to:
   execute a localization method to determine where the at least one of the plurality of electronic shelf labels is located within the 3D model; and
   associate the at least one of the plurality of electronic shelf labels with the electronic display device using the 3D model.

7. The system of claim 1, wherein the data is price information and the price information received by each of the electronic shelf labels corresponds to products expected to be located at locations where each of the electronic shelf labels are disposed or at locations where each of the electronic shelf labels are to be disposed.

8. The system of claim 1, wherein the electronic display of the electronic display device is larger than the electronic display of each of the electronic shelf labels.

9. The system of claim 1, wherein adjustment of the electronic display of the electronic display device changes at least one of a price, text, or lighting displayed on the electronic display device.

10. The system of claim 1, wherein the plurality of electronic shelf labels are included in the group based on locations at which each of the electronic shelf labels are disposed.

11. The system of claim 1, wherein the plurality of electronic shelf labels are included in the group based on established communication between the plurality of electronic shelf labels and the electronic display device.

12. The system of claim 1, wherein the computing system associates the plurality of the electronic shelf labels with the electronic display device.

13. The system of claim 12, wherein the computing device associates the plurality of the electronic shelf labels with the electronic display device based on a planogram of a facility within which the plurality of electronic shelf labels and the electronic display device are disposed.

14. The system of claim 1, wherein the at least one of the plurality of electronic shelf labels is disassociated from the electronic display device based on a change in location of the at least one of the plurality of electronic shelf labels.

15. A method comprising:
   receiving, by each electronic shelf label of a plurality of electronic shelf labels configured to be selectively associated with an electronic display device to form a group, from a computing system, data to render on the electronic display of each of the electronic shelf labels;

determining, via the electronic display device based on at least one of a set of specified conditions or the data rendered on each of the electronic shelf labels, content to be rendered on an electronic display of the electronic display device; and adjusting, via the electronic display device, the display of the electronic display device to render the content based on the determination;

wherein at least one of the plurality of electronic shelf labels is configured to be disassociated from the electronic display device to ungroup the at least one of the plurality of electronic shelf labels.

16. The method of claim 15, further comprising receiving the data by each of the electronic shelf labels based on a location of each of the electronic shelf labels.

17. The method of claim 15, further comprising displaying, by each of the electronic shelf labels, a price for a specified product based on a location of each of the electronic shelf labels.

18. The method of claim 15, further comprising associating, via a NFC module associated with at least one electronic shelf label of the plurality of electronic shelf labels, the at least one electronic shelf label with the electronic display device when transmission from the NFC of the at least one electronic shelf label is within range of electronic display device.

19. The method of claim 15, further comprising adjusting the electronic display of the electronic display device to change at least one of a price, text, or lighting displayed on the electronic display device.

* * * * *

UNITED STATES PATENT AND TRADEMARK OFFICE
CERTIFICATE OF CORRECTION

PATENT NO. : 11,494,821 B2
APPLICATION NO. : 16/837664
DATED : November 8, 2022
INVENTOR(S) : Donald Ray High, Martin Thomas Faitak, IV and Michael Dean Atchley It is certified that error appears in the above-identified patent and that said Letters Patent is hereby corrected as shown below:

In the Claims
In Column 10, Claim 4, Lines 11-12, delete "at least at least" and insert -- at least --, therefor.

Signed and Sealed this
Twenty-first Day of March, 2023

Katherine Kelly Vidal
*Director of the United States Patent and Trademark Office*